(12) United States Patent
Jiang et al.

(10) Patent No.: US 9,018,119 B2
(45) Date of Patent: Apr. 28, 2015

(54) METHOD FOR PREPARING MANGANESE SULFATE MONOHYDRATE BY DESULFURIZING FUME WITH MIDDLE-LOW GRADE MANGANESE DIOXIDE ORE

(75) Inventors: Zhiguang Jiang, Anshun (CN); Dong Hua, Chongqing (CN); Fei Wu, Tongren (CN)

(73) Assignee: Guizhou Redstar Developing Co., Ltd., Anshun, Guizhou Province (CN)

( * ) Notice: Subject to any disclaimer, the term of this patent is extended or adjusted under 35 U.S.C. 154(b) by 587 days.

(21) Appl. No.: 13/514,397

(22) PCT Filed: Jul. 20, 2010

(86) PCT No.: PCT/CN2010/075314
§ 371 (c)(1),
(2), (4) Date: Jun. 7, 2012

(87) PCT Pub. No.: WO2011/041956
PCT Pub. Date: Apr. 14, 2011

(65) Prior Publication Data
US 2012/0328495 A1    Dec. 27, 2012

(30) Foreign Application Priority Data

Oct. 10, 2009   (CN) .......................... 2009 1 0179944

(51) Int. Cl.
| | | |
|---|---|---|
| B01J 38/48 | (2006.01) | |
| B01J 23/32 | (2006.01) | |
| C01G 45/00 | (2006.01) | |
| C22B 11/00 | (2006.01) | |
| C01G 45/10 | (2006.01) | |
| B01D 53/50 | (2006.01) | |
| B01D 53/80 | (2006.01) | |

(52) U.S. Cl.
CPC ................ *C01G 45/10* (2013.01); *B01D 53/50* (2013.01); *B01D 53/80* (2013.01); *B01D 2251/60* (2013.01)

(58) Field of Classification Search
None
See application file for complete search history.

(56) References Cited

U.S. PATENT DOCUMENTS

| | | | | |
|---|---|---|---|---|
| 3,101,303 | A | * 8/1963 | Batchelor et al. ................ | 201/17 |
| 4,180,549 | A | * 12/1979 | Olsson et al. .................. | 423/230 |
| 5,586,053 | A | * 12/1996 | Park ................................ | 703/1 |

* cited by examiner

*Primary Examiner* — Melvin C Mayes
*Assistant Examiner* — Sheng H Davis
(74) *Attorney, Agent, or Firm* — Nath, Goldberg & Meyer; Tanya E. Harkins; Joshua B. Goldberg

(57) ABSTRACT

A method for preparing manganese sulfate monohydrate by desulfurizing fume with middle-low grade manganese dioxide ore, which includes: preparing a slurry by using middle-low grade manganese dioxide ore powder, putting sulfur-containing fume in an absorbing device and controlling gas velocity and gas-liquid ratio, and then adding manganese dioxide slurry and controlling the slurry to backwards flow relative to the sulfur-containing fume, discharging the desulfurized fume from the absorbing device, pressure-filtering and separating the slurry discharged from the absorbing device, recycling the mother liquor to the absorbing device, and continuing the recycling operation until the manganese sulfate in the mother liquor is >=200 g/l, the obtained filter cake at 60-70° C., adjusting pH value of the clear solution obtained to 2-4, adding manganese sulfide under agitation at 25-95° C., and removing impurities, continuing agitating, pressure-filtering and separating, vaporizing the obtained clear filtrate, and obtaining manganese sulfate monohydrate after drying in the air stream.

12 Claims, 1 Drawing Sheet

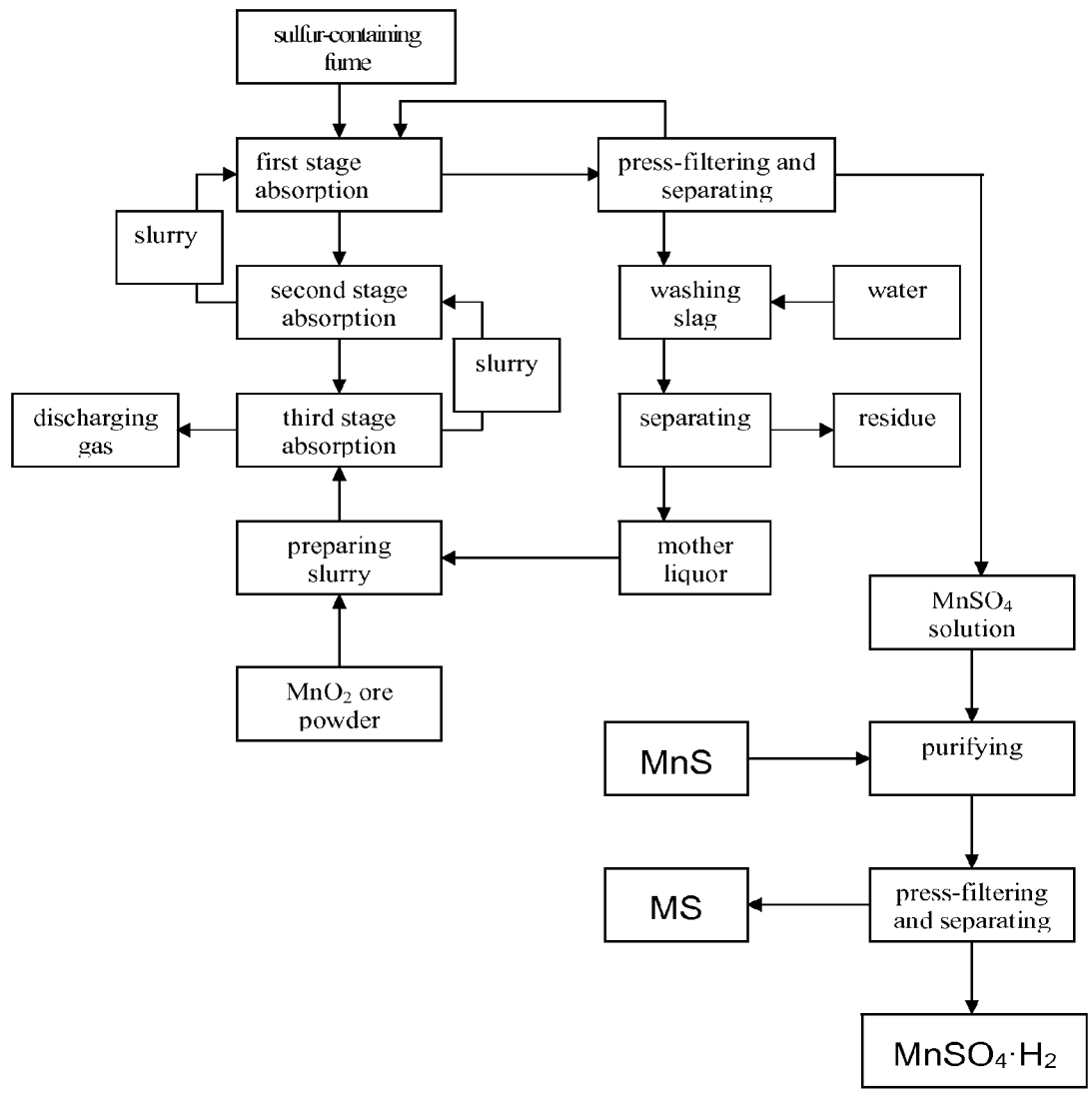

METHOD FOR PREPARING MANGANESE SULFATE MONOHYDRATE BY DESULFURIZING FUME WITH MIDDLE-LOW GRADE MANGANESE DIOXIDE ORE

This is a National Phase Application filed under 35 U.S.C. 371 as a national stage of PCT/CN2010/075314, filed Jul. 20, 2010, and claiming the benefit from China Application No. 200910179944.9, filed Oct. 10, 2009, the content of each of which is hereby incorporated by reference in its entirety.

TECHNICAL FIELD

The present invention relates to a method for preparing manganese sulfate monohydrate ($MnSO_4 \cdot H_2O$) by desulfurizing fume with middle-low grade manganese dioxide ($MnO_2$) ore.

BACKGROUND ART

There are some literatures and patent applications relating to the researches on using manganese dioxide for desulfurizing fume. For example, CN1824372A discloses the technology of desulfurizing fume with microwave catalysis, which has a higher desulfurizing efficiency for simulation fume, but needs special equipments. Besides, the gas after desulfurization requires to be absorbed with dilute acid, and catalyst beds require regeneration treatment constantly, which are unfavorable to stable operations of production installations for continuous mass industrial production. Chemical manganese dioxide or electrolytic manganese dioxide having very high cost thereof is used in desulfurization treatment in CN 1883764A, so that the production cost is higher and the operations are complex, which is not suitable for actual conditions of China. Besides, the post-treatments of manganese sulfate solution produced by the process of desulfurization are also not mentioned.

SUMMARY OF THE INVENTION

The present invention provides a method for preparing manganese sulfate monohydrate ($MnSO_4 \cdot H_2O$) by desulfurizing fume with middle-low grade manganese dioxide ($MnO_2$) ore. The method relates to the chemistry reactions given as follows:

$SO_2 + H_2O \rightarrow H_2SO_3$ $H_2SO_3 + MnO_2 \rightarrow MnSO_4 + H_2O$ $MO + H_2SO_3 \rightarrow MSO_4 + H_2O$ (M=Fe, Co, Ni, Cu, Zn and etc.)

$MSO_4 + MnS \rightarrow MS + MnSO_4$

The present invention relates to the method for preparing manganese sulfate monohydrate by desulfurizing fume with middle-low grade manganese dioxide ore, which comprises the following steps:

A. Firstly, choosing $MnO_2$ ore powder having a fineness between 80-100 mesh size obtained by treatment, preferably using wet ball milling or rod milling, preparing a slurry with an initial solid-liquid ratio of 10-30% (percentage of weight) in water or recycling mother liquor or liquid obtained from washing slag so that $MnO_2$ content in the slurry is greater than or equal to 1.5% (percentage of weight). Wherein, Tyler screen is used for screening when manganese dioxide ore powder is pretreated in the present invention, i.e., the range of particle size of 80-100 mesh corresponds to 150-180 mm.

B. Firstly, putting sulfur-containing fume which may be coal-fired converter exhaust, boiler exhaust or other sulfur dioxide-containing exhaust into an absorbing device, and controlling the gas velocity between 0.5-4 m/sec and gas-liquid ratio between 10-40 $L/m^3$ generally.

Then adding manganese dioxide ($MnO_2$) slurry into the absorption device and controlling the slurry to backwards flow relative to the sulfur-containing fume, feeding the slurry into separating procedure when manganese dioxide is reacted fully, and discharging the desulfurized fume from the absorbing device.

Wherein, when ore powder with total manganese content equal to or less than 15% (percentage of weight) is used as start material, the initial solid-liquid ratio is 25-30%, superficial velocity is 1.5±0.2 m/sec and the gas-liquid ratio is 15-25 $L/m^3$ Preferably, the temperature of gas outlet is controlled ≥60° C. so as to maintain a certain evaporation capacity of solution, and therefore the effect of concentration is ensured.

C. Pressure-filtering and separating the manganese dioxide slurry discharged in the step B, recycling the mother liquor obtained by pressure-filtering and separating into the absorbing device, in which the detailed position is slurry-circulating tank, evaporating and concentrating it in virtue of heat energy of the fume, and continuing the recycling operation until the concentration of manganese sulfate in the mother liquor becomes ≥200 g/l.

Preferably, the absorbing devices in said steps B and C may be three-stage absorption devices, in this case, specifically, said steps B and C are described as follows:

B. Firstly, putting sulfur-containing fume into a first stage device of the absorbing devices based on controlling the gas velocity between 0.5-4 m/sec and the gas-liquid ratio between 10-40 $L/m^3$, and then adding manganese dioxide slurry into a third stage device of the absorption devices and controlling the slurry to backwards flow relative to the sulfur-containing fume, self-circulation is carried out in each stage device of the three-stage absorption devices respectively and simultaneously, i.e., the absorption slurry in the first stage device is continuously supplemented from the absorption slurry in the second stage device, the absorption slurry in a second stage device is continuously supplemented from the absorption slurry in the third stage device, the absorption slurry in the third stage device is continuously supplemented from manganese dioxide slurry prepared newly, the absorption slurry is fed into separating procedure from the first stage device when manganese dioxide is reacted fully, and the desulfurized fume is discharged from the third stage device of the absorbing devices.

C. Pressure-filtering and separating the manganese dioxide slurry discharged in the step B, recycling the mother liquor obtained by pressure-filtering and separating to the circulating tank in the first stage device of the absorbing device, evaporating and concentrating it in virtue of heat energy of the fume, and continuing the recycling operation until the concentration of manganese sulfate in the mother liquor becomes ≥200 g/l.

Wherein, three-stage absorption devices are common experiment devices in the art, the objects of using three-stage absorption devices in the present invention lie in that the start material is used sufficiently, the cost is saved, the reacting efficiency is increased, the reaction is carried out continuously and the method of the present invention is optimized. What needs to be emphasized is that other methods which can optimize the absorption devices also play a role of optimizing the present invention, for example two-stage or multistage absorption devices can also realize the present invention.

D. Adjusting pH value of the clear solution which is obtained by pressure-filtering and separating in the step C and meets the concentration requirement to 2-4, perfectly adjusting pH to 3.0-3.5, wherein lime cream or dilute sulphuric acid may be used for adjusting pH value, controlling the temperature of the clear solution between room temperature (25° C.) and 95° C., perfectly at 50-70° C., adding manganese sulfide under agitation, wherein the manganese sulfide may be manganese sulfide of industrial grade produced by Guizhou Redstar Developing Co. Ltd, filtering and removing impurities with filter membrane of 0.5 μm, continuously agitating for 1-1.5 h, and then press-filtering and separating, vaporizing the obtained clear filtrate, preferably multiple effect evaporation, and drying obtained solid in the air stream to obtaining manganese sulfate monohydrate product. The obtained filter residue comprises mainly metal sulfide, which is used for recycling the valuable metals.

Said multiple effect evaporation is a common method for reducing consumption of vapor in the art, and the secondary vapor produced from evaporation is used for heating the solution with low temperature so as to realize the aim of saving the cost.

Step E may be also comprised after said step C, i.e., agitating and washing the filter cake obtained by pressing-filtering and separating in step C with water for 1-1.5 h at 60-70° C., controlling the material-water ratio in a range of 1:4-1:5. Preferably, high concentration slag is washed with low concentration water, in which the number of washing times is increased, washing efficiency is increased and the volume of solution is reduced in the meantime. Manganese dioxide ore powder residue obtained by washing and press-filtering is blended and used for manufacturing building materials or directly treated as harmless landfill, and the obtained mother liquor may be used for preparing slurry.

The method for preparing manganese sulfate monohydrate by desulfurizing fume with middle-low grade manganese dioxide ore in present invention comprises the following treatments: preparing a slurry directly by using middle-low grade manganese dioxide ore powder, spraying and absorbing, and desulfurizing, so that the method does not need special equipment. Besides, the method also comprises concentrating manganese sulfate solution produced by desulfurization, removing impurities and recycling valuable metal, so that resources are used sufficiently, and the method has the properties of operability and enforceability. In the present invention, the slurry is prepared by using middle-low grade manganese dioxide ore powder, and multistage sprayed to desulfurize fume under the wet process based on oxidation-reduction reaction, so that the problems of desulfurization efficiency and stable operation is resolved. Lower concentration manganese sulfate solution produced by desulfurization in the present invention is recycled and concentrated with the energy of fume, so that the problems of the production cost for producing manganese sulfate product is resolved. The recycling rate of total manganese in the present invention is improved by using multistage counter current treatment. Special impurity-removing agent is used for cleaning and removing impurities in manganese sulfate solution in the present invention and the valuable metals are recycled in high efficiency in the meantime.

BRIEF DESCRIPTION OF THE DRAWINGS

FIG. 1 Main process flow diagram of the present invention

EMBODIMENT

Example 1

Sulfur-containing fume is converter exhaust produced in preparing industrial barium carbonate with carbon reduction process, the average gas amount of which is 25000 $NM^3/H$, the average sulfur dioxide content of which is 13400 $mg/m^3$, and the temperature of gas outlet of cyclone dust collector is about 170° C.

A. 1 kg of manganese dioxide ore powder with a total manganese content of 15% based on wet base is chosen, treated with wet ball milling to make the ore powder pass through an 80 mesh sieve, and prepared into a slurry having an initial solid-liquid ratio of 25% (percentage of weight) with water. The manganese dioxide content in the obtained manganese dioxide slurry is 4.75%.

B. Firstly, said sulfur-containing fume is putted in a first stage device of an absorbing devices, superficial velocity is controlled at 1.5 m/sec, and the ratio of gas-liquid recycling and spraying (gas-liquid ratio) is above 15 $L/m^3$. And then manganese dioxide slurry prepared in step A is added into a third stage device of the absorption devices, the slurry is controlled to backwards flow relative to the sulfur-containing fume, and self-circulation is carried out in each stage device of the three-stage absorption devices respectively and simultaneously, i.e., the absorption slurry in the first stage device is continuously supplemented from the absorption slurry in a second stage device, the absorption slurry in the second stage device is continuously supplemented from the absorption slurry in the third stage device, the absorption slurry in the third stage device is continuously supplemented from manganese dioxide slurry prepared newly, the slurry is fed into separating procedure from the first stage device when manganese dioxide is reacted fully, and the desulfurized fume is discharged from the third stage device of the absorbing devices, the outlet temperature of desulfurized fume in the third stage device is 65° C., and sulfur dioxide content is 213-402 $mg/m^3$.

C. The discharged manganese dioxide slurry is pressure-filtered and separated. The mother liquor obtained by pressure-filtering and separating is recycled into the circulating tank of the first stage device of the absorbing device, and evaporated and concentrated in virtue of heat energy of the fume. The manganese sulfate in the mother liquor is 317 g/l after the recycling operation is repeated three times continuously.

D. pH value of the clear solution obtained by pressure-filtering and separating in step C is adjusted with lime cream to 3.5, the temperature of the clear solution is controlled at 60° C., manganese sulfide of industrial grade/produced by Guizhou Redstar Developing Co., Ltd is added under agitation, filter membrane of 0.5 nm is used for filtering and removing impurities, the filtrate is press-filtered and separated after continuously agitating for 1.5 h, the obtained clear filtrate is multiple effect evaporated, and the sample 1# of manganese sulfate monohydrate is obtained after crystallizing and drying in the air stream.

Filter cake of sulfur-containing compounds obtained by purifying manganese sulfate solution is dried and MS sample 1# is obtained.

Example 2

The step used in example 2 is the same as that of example 1 other than the selected parameters and steps shown as follows, and the sample 2# of manganese sulfate monohydrate is obtained.

The total manganese content of manganese dioxide ore powder is 9.10% based on wet base. The manganese dioxide ore powder is treated with wet ball milling to make the ore powder pass through a 100 mesh sieve. The initial solid-liquid ratio of the slurry is 30%, and manganese dioxide content in the obtained manganese dioxide slurry is 3.33%. The ratio of gas-liquid recycling and spraying is about 17 L/m³, superficial velocity is 1.3 m/sec, the outlet temperature of desulfurized fume in the third stage device is 70° C., and sulfur dioxide content in desulfurized fume obtained from outlet of the third stage device is 271-640 mg/m³.

The concentration of manganese sulfate in the mother liquor is determined as 289 g/L after five times of continuous recycling operation, pH value of the obtained clear solution is adjusted with dilute sulfuric acid to 4, the temperature of the solution is controlled at 50° C., the obtained filter cake is agitated and washed with water for 1.5 h at 60° C. based on controlling the material-water ratio at 1:5, and the obtained mother liquor is used for preparing slurry.

Filter cake of sulfur-containing compounds obtained by purifying manganese sulfate solution is dried and MS sample 2# is obtained.

Example 3

The step used in example 3 is the same as that of example 1 other than the selected parameters and steps shown as follows, and the sample 3# of manganese sulfate monohydrate is obtained.

Sulfur-containing fume is converter exhaust produced by preparing industrial barium strontium with carbon reduction process, the average gas amount of which is 17000 NM³/H, the average sulfur dioxide content of which is 11500 mg/m³, and the temperature of gas outlet of cyclone dust collector is about 150° C.

The total manganese content of manganese dioxide ore powder is 14.22% based on wet base. The manganese dioxide ore powder is treated with wet rod milling. The initial solid-liquid ratio of the slurry is 28%, and manganese dioxide content in the obtained manganese dioxide slurry is 4.92%. The ratio of gas-liquid recycling and spraying is about 25 L/m³, superficial velocity is 1.7 m/sec, the outlet temperature of desulfurized fume in the third stage device is 60° C., and sulfur dioxide content in desulfurized fume obtained from outlet of the third stage device is 114-322 mg/m³.

The concentration of manganese sulfate in the mother liquor is determined as 304 g/L after three times of continuous recycling operation, pH value of the obtained clear solution is adjusted with dilute sulfuric acid to 3.0, the temperature of solution is controlled at 70° C., the obtained filter cake is washed under 70° C., high concentration residue is washed with low concentration water for 1.5 h, the material-water ratio is controlled to be 1:4, and the obtained mother liquor is used for preparing slurry.

Filter cake of sulfur-containing compounds obtained by purifying manganese sulfate solution is dried and MS sample 3# is obtained.

Example 4

The step used in example 4 is the same as that of example 1 other than the selected parameters and steps shown as follows, and the sample 4# of manganese sulfate monohydrate is obtained.

Sulfur-containing fume is coal-fired converter exhaust, the average gas amount of which is 31000 NM³/H, the average sulfur dioxide content of which is 4800 mg/m³, and the temperature of gas outlet of cyclone dust collector is about 170° C.

The total manganese content of manganese dioxide ore powder is 9.10% based on wet base, the initial solid-liquid ratio of the slurry is 25%, and manganese dioxide content in obtained manganese dioxide slurry is 2.88%. The ratio of gas-liquid recycling and spraying is about 20 L/m³, superficial velocity is 1.5 m/sec, the outlet temperature of desulfurized fume in the third stage device is 75° C., and sulfur dioxide content in desulfurized fume obtained from outlet of the third stage device is 74-162 mg/m³.

The concentration of manganese sulfate in the mother liquor is determined as 372 g/L after five times of continuous recycling operation, pH value of the obtained clear solution is adjusted to 2.0.

Filter cake of sulfur-containing compounds obtained by purifying manganese sulfate solution is dried and MS sample 4# is obtained.

Main component contents of the obtained samples of manganese sulfate monohydrate (percentage by weight) are determined and the results are showed in following table.

|                        | 1#              | 2#     | 3#     | 4#     |
| ---------------------- | --------------- | ------ | ------ | ------ |
| MnSO$_4$•H$_2$O        | 98.77%          | 98.34% | 98.61% | 98.42% |
| Pb                     | ND(not determined) | ND  | ND     | ND     |
| As                     | ND              | ND     | ND     | ND     |
| Cd                     | ND              | ND     | ND     | ND     |

Main component contents of the obtained samples of MS (percentage by weight) are determined and the results are showed in following table.

| MS | Cu    | Co    | Ni    | Zn    | Pb    | Fe     |
| -- | ----- | ----- | ----- | ----- | ----- | ------ |
| 1# | 2.04% | 0.22% | 0.71% | 0.49% | 0.14% | 17.26% |
| 2# | 3.41% | 0.13% | 1.52% | 0.43% | 0.22% | 19.10% |
| 3# | 1.14% | 0.35% | 2.11% | 0.72% | 0.13% | 20.17% |
| 4# | 2.21% | 0.24% | 0.68% | 0.51% | 0.15% | 17.47% |

The invention claimed is:

1. A method for preparing manganese sulfate monohydrate by desulfurizing fume with middle-low grade manganese dioxide ore comprising the following steps:

A. choosing manganese dioxide ore powder having a fineness between 80-100 mesh size obtained by treatment, preparing a slurry with an initial solid-liquid ratio of 10-30% in water or recycling mother liquor or liquid obtained from washing slag, so that MnO$_2$ content in the slurry is greater than or equal to 1.5% (percentage of weight);

B. firstly putting sulfur-containing fume into an absorbing device based on controlling gas velocity between 0.5-4 m/sec and gas-liquid ratio between 10-40 L/m³, then adding the manganese dioxide slurry into the absorption device, controlling the slurry to backwards flow relative to the sulfur-containing fume, feeding the slurry into a separating procedure after manganese dioxide ore powder is reacted fully, and discharging the desulfurized fume from the absorbing device;

C. pressure-filtering and separating the manganese dioxide slurry in the separating procedure in the step B, recycling the mother liquor obtained by pressure-filtering and separating to the absorbing device, evaporating and concentrating it using the heat energy of the fume, and continuing the recycling operation until the concentration of manganese sulfate in the mother liquor becomes >200 g/l;

D. adjusting pH value of the clear solution obtained by pressure-filtering and separating in the step C to 2-4, controlling the temperature of the clear solution at 25° C.-95° C., adding manganese sulfide to react under agitation, filtering and removing impurities, continuously agitating for 1-1.5 h and then pressure-filtering and separating, vaporizing the obtained clear filtrate, and drying obtained solid in the air stream to obtain manganese sulfate monohydrate product.

2. The method for preparing manganese sulfate monohydrate by desulfurizing fume with middle-low grade manganese dioxide ore according to claim 1, is characterized in that the absorbing devices used in said steps B and C are three-stage absorption devices, in this case, specifically, said steps B and C are described as follows:

B. firstly putting sulfur-containing fume in a first stage device of the absorbing devices based on controlling the gas velocity between 0.5-4 m/sec and gas-liquid ratio between 10-40 L/m$^3$, then adding the manganese dioxide slurry into a third stage device of the absorption devices and controlling the slurry to backwards flow relative to the sulfur-containing fume, carrying out self-circulation in each stage device of the three-stage absorption devices respectively and simultaneously so that the absorption slurry in the first stage device is continuously supplemented from the absorption slurry in a second stage device, the absorption slurry in the second stage device is continuously supplemented from the absorption slurry in the third stage device, the absorption slurry in the third stage device is continuously supplemented from manganese dioxide slurry prepared newly; the absorption slurry is fed into separating procedure from the first stage device when manganese dioxide is reacted fully, and the desulfurized fume is discharged from the third stage device of the absorbing devices;

C. pressure-filtering and separating the manganese dioxide slurry discharged in the step B, recycling the mother liquor obtained by pressure-filtering and separating to the first stage device of the absorbing devices, evaporating and concentrating it using the heat energy of the fume, and continuing the recycling operation until the concentration of manganese sulfate in the mother liquor becomes ≥200 g/l.

3. The method for preparing manganese sulfate monohydrate by desulfurizing fume with middle-low grade manganese dioxide ore according to claim 1, is characterized in that manganese dioxide ore powder is treated with wet ball milling or rod milling in said step A.

4. The method for preparing manganese sulfate monohydrate by desulfurizing fume with middle-low grade manganese dioxide ore according to claim 1, is characterized in that, when ore powder with total manganese content equal to or less than 15% is used as start material in said step A, the initial solid-liquid ratio is 25-30%, superficial velocity is 1.5±0.2 m/sec and the gas-liquid ratio is 15-25 L/m$^3$.

5. The method for preparing manganese sulfate monohydrate by desulfurizing fume with middle-low grade manganese dioxide ore according to claim 1, is characterized in that the sulfur-containing fume is put into the absorbing devices in said step B is coal-fired converter exhaust, boiler exhaust or other sulfur dioxide-containing exhaust.

6. The method for preparing manganese sulfate monohydrate by desulfurizing fume with middle-low grade manganese dioxide ore according to claim 1, is characterized in that the temperature of gas outlet is ≥60° C. in said step B.

7. The method for preparing manganese sulfate monohydrate by desulfurizing fume with middle-low grade manganese dioxide ore according to claim 1, is characterized in that lime cream or dilute sulphuric acid is used for adjusting pH value of the clear solution in said step D.

8. The method for preparing manganese sulfate monohydrate by desulfurizing fume with middle-low grade manganese dioxide ore according to claim 1, is characterized in that pH value of the clear solution is adjusted to 3.0-3.5 in said step D.

9. The method for preparing manganese sulfate monohydrate by desulfurizing fume with middle-low grade manganese dioxide ore according to claim 1, is characterized in that the temperature of the clear solution is 50-70° C. in said step D.

10. The method for preparing manganese sulfate monohydrate by desulfurizing fume with middle-low grade manganese dioxide ore according to claim 1, is characterized in that the following step E is further comprised after said step C: agitating and washing the filter cake obtained by pressure-filtering and separating in the step C with water for 1-1.5 h at 60-70° C., controlling a material-water ratio in a range of 1:4-1:5, wherein the obtained mother liquor is used for preparing slurry in said step A.

11. The method for preparing manganese sulfate monohydrate by desulfurizing fume with middle-low grade manganese dioxide ore according to claim 10, is characterized in that high concentration slag is washed with low concentration water during the process of washing filter cake in said step E.

12. The method for preparing manganese sulfate monohydrate by desulfurizing fume with middle-low grade manganese dioxide ore according to claim 1, is characterized in that filter membrane of 0.5 μm is used in filtering and removing impurities step in said step D.

* * * * *